United States Patent
Chen et al.

(10) Patent No.: US 10,904,448 B2
(45) Date of Patent: Jan. 26, 2021

(54) CONTROLLING FLASH BEHAVIOR DURING CAPTURE OF IMAGE DATA

(71) Applicant: MOTOROLA MOBILITY LLC, Chicago, IL (US)

(72) Inventors: Yin Hu Chen, Deerfield, IL (US); Valeriy Marchevsky, Glenview, IL (US); Susan Yanqing Xu, Westmont, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/649,588

(22) Filed: Jul. 13, 2017

(65) Prior Publication Data
US 2019/0020803 A1    Jan. 17, 2019

(51) Int. Cl.
| | | |
|---|---|---|
| *H04N 5/235* | (2006.01) | |
| *G03B 7/17* | (2014.01) | |
| *H04N 5/225* | (2006.01) | |
| *G06K 9/00* | (2006.01) | |
| *G03B 15/05* | (2006.01) | |
| *G01S 11/12* | (2006.01) | |
| *H04N 5/232* | (2006.01) | |
| *H04N 5/222* | (2006.01) | |
| *G06K 9/20* | (2006.01) | |

(52) U.S. Cl.
CPC ............ *H04N 5/2354* (2013.01); *G01S 11/12* (2013.01); *G03B 7/17* (2015.01); *G03B 15/05* (2013.01); *G06K 9/00255* (2013.01); *G06K 9/2027* (2013.01); *H04N 5/2226* (2013.01); *H04N 5/2258* (2013.01); *H04N 5/2351* (2013.01); *H04N 5/23216* (2013.01); *H04N 5/23219* (2013.01); *H04N 5/2256* (2013.01)

(58) Field of Classification Search
CPC .............................. G03B 15/05; H04N 5/2354
USPC ......................................................... 348/77
See application file for complete search history.

(56) References Cited

U.S. PATENT DOCUMENTS

| | | | | | |
|---|---|---|---|---|---|
| 5,264,895 | A | * | 11/1993 | Takahashi | G03B 15/05 315/240 |
| 5,860,029 | A | * | 1/1999 | Ichikawa | G03B 15/05 396/61 |
| 5,864,360 | A | * | 1/1999 | Okauchi | H04N 5/232 348/47 |

(Continued)

*Primary Examiner* — Amir Shahnami
(74) *Attorney, Agent, or Firm* — Yudell Isidore PLLC (57) ABSTRACT

A method, system, and computer program product controlling flash behavior of a camera during capture of image data. The method includes identifying a target object from among a plurality of objects in a current scene. The method further includes determining whether a distance to the target object is within an effective flash range associated with at least one flash module of an image capturing device. The method further includes measuring, via at least one camera, an ambient light level within the current scene and comparing the measured ambient light level to a predetermined flash light threshold. The method further includes, in response to determining the target object is within the effective flash range and the measured ambient level is less than the predetermined flash light threshold, triggering at least one flash module of the image capturing device to illuminate the current scene during capture of image data by the at least one camera.

20 Claims, 4 Drawing Sheets

(56) References Cited

U.S. PATENT DOCUMENTS

| | | | | |
|---|---|---|---|---|
| 2003/0179949 A1* | 9/2003 | Terashita | ........... | H04N 1/00167 |
| | | | | 382/274 |
| 2007/0120970 A1* | 5/2007 | Goffin | .................... | H04N 7/147 |
| | | | | 348/14.16 |
| 2007/0230933 A1* | 10/2007 | Sugimoto | .............. | G03B 15/03 |
| | | | | 396/61 |
| 2008/0101786 A1* | 5/2008 | Pozniansky | .......... | H04N 5/2354 |
| | | | | 396/159 |
| 2009/0073304 A1* | 3/2009 | Kumagai | ................ | G03B 13/30 |
| | | | | 348/345 |
| 2012/0177352 A1* | 7/2012 | Pillman | .............. | H04N 5/23248 |
| | | | | 396/61 |
| 2016/0012283 A1* | 1/2016 | Mitoma | .................... | B60R 1/00 |
| | | | | 382/103 |
| 2016/0377708 A1* | 12/2016 | Lou | ....................... | G01S 7/4865 |
| | | | | 348/221.1 |

\* cited by examiner

CONTROLLING FLASH BEHAVIOR DURING CAPTURE OF IMAGE DATA

BACKGROUND

1. Technical Field

The present disclosure generally relates to electronic devices having camera sensors and in particular to a method for capturing image data in a current scene.

2. Description of the Related Art

Many modern personal devices, such as cellular phones, are equipped with cameras that can be used to capture images and/or video in a field of view. These cameras often utilize flash modules that are automatically triggered, based on an ambient light level of the current scene, to illuminate a dark scene during capture of the image data. However, when a subject in the scene is far away from the camera, the flash module provides no perceivable benefit in the captured image data. Additionally, the use of a flash in dark scenes may be very distracting to other people in the area.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a system, and a computer program product for controlling flash behavior of a camera during capture of image data. The method includes identifying a target object from among a plurality of objects in a current scene. The method further includes determining whether a distance to the target object is within an effective flash range associated with at least one flash module of an image capturing device. The method further includes measuring, via at least one camera, an ambient light level within the current scene and comparing the measured ambient light level to a predetermined flash light threshold. The method further includes, in response to determining the target object is within the effective flash range and the measured ambient level is less than the predetermined flash light threshold, triggering at least one flash module of the image capturing device to illuminate the current scene during capture of image data by the at least one camera.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within image capturing device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
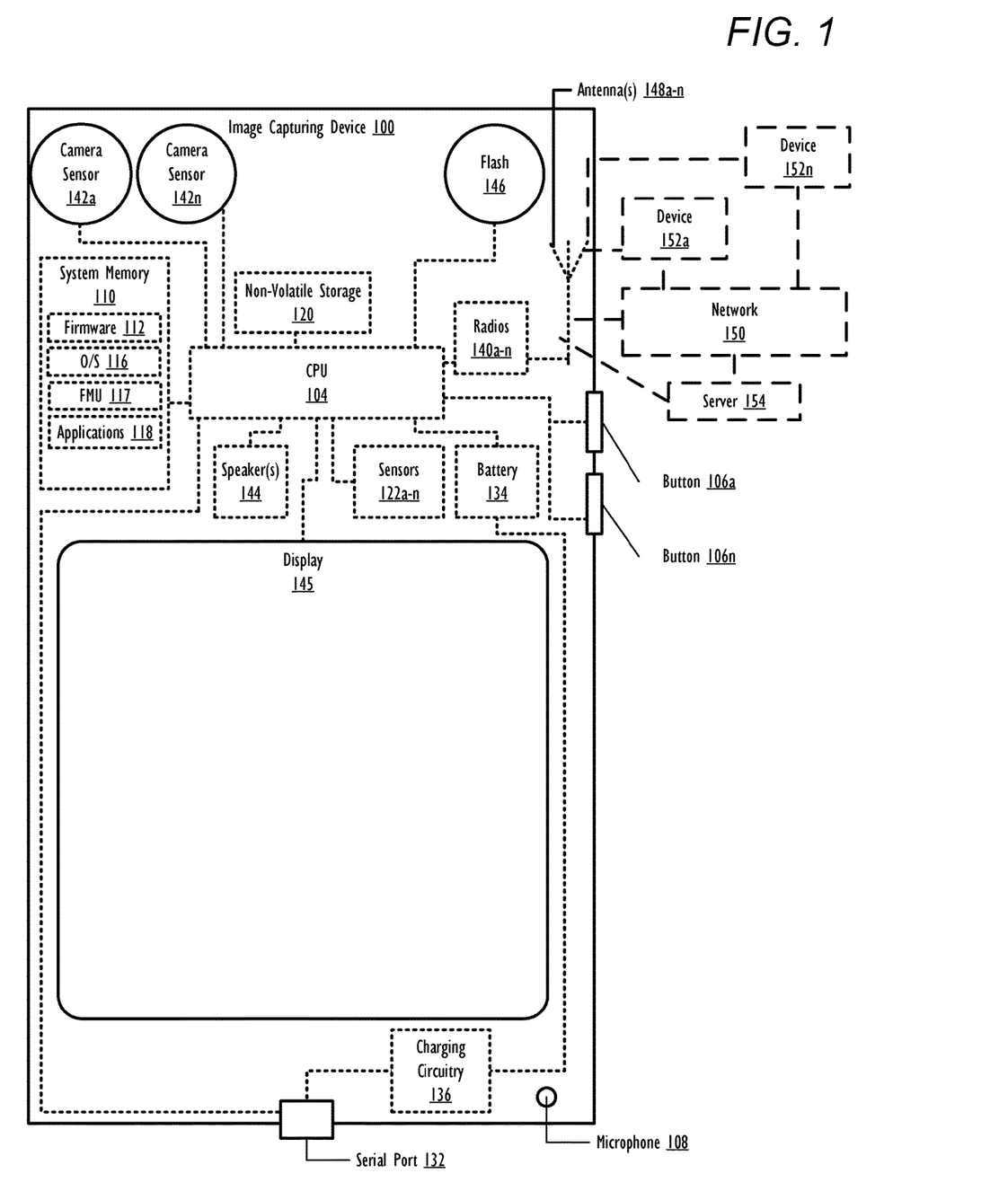
FIG. 1 illustrates an image capturing device within which certain aspects of the disclosure can be practiced, in accordance with one or more embodiments.

Now turning to FIG. 1, there is illustrated an example image capturing device 100 within which one or more of the described features of the various embodiments of the disclosure can be implemented. In one embodiment, image capturing device 100 can be any electronic device that is equipped with at least one camera. Example image capturing devices can include, but are not limited to, a desktop computer, a monitor, a notebook computer, a mobile phone, a digital camera, a video recorder, or a tablet computer. Image capturing device 100 includes at least one processor or central processing unit (CPU) 104. CPU 104 is coupled to non-volatile storage 120 and system memory 110, within which firmware 112, operating system (OS) 116, flash monitoring utility (FMU) 117, and applications 118 can be stored for execution by CPU 104. According to one aspect, FMU 117 executes within image capturing device 100 to perform the various methods and functions described herein. In one or more embodiments, FMU 117 controls behavior of a flash during capture of image data by cameras of image capturing device 100. For simplicity, FMU 117 is illustrated and described as a stand-alone or separate software/firmware/logic component, which provides the specific functions and methods described below. However, in at least one embodiment, FMU 117 may be a component of, may be combined with, or may be incorporated within firmware 112, or OS 116, and/or within one or more of applications 118.

As shown, image capturing device 100 may include input devices and output devices that enable a user to interface with image capturing device 100. In the illustrated embodiment, image capturing device 100 includes camera(s) 142a-n, flash(es) 146, display 145, hardware buttons 106a-n, microphone(s) 108, and speaker(s) 144. Cameras 142a-n can be used to capture image data in a current scene. In one or more embodiments, cameras 142a-n are Bayer camera sensors. Cameras 142a-n can also be utilized in a stereo mode to scan a current scene for objects in order to create a depth map that identifies a depth (distance) of the objects in the current scene. While two cameras are illustrated, image capturing device 100 may include additional cameras, in other embodiments. Flash 146 is utilized to illuminate objects in a scene with artificial light. In one or more embodiments, flash 146 is a light emitting diode (LED) flash module. Hardware buttons 106a-n are selectable buttons which are used to receive manual/tactile input from a user to control specific operations of image capturing device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of image capturing device 100. In one embodiment, hardware buttons 106a-n may include a keyboard. Microphone(s) 108 may be used to receive spoken input/commands from a user. Speaker(s) 144 is used to output audio.

CPU 104 is also coupled to sensors 122a-n and display 145. Sensors 122a-n can include, but are not limited to, at least one of: infrared (IR) sensors, time-of-flight emitters/receivers, structured light emitters/receivers, thermal sensors, light sensors, motion sensors and/or accelerometers, proximity sensors, and camera/image sensors. Display 145 is capable of displaying text, media content, including images and video, and/or a graphical user interface (GUI) associated with or generated by firmware and/or one or more applications executing on image capturing device 100. The GUI can be rendered by CPU 104 for viewing on display 145, in one embodiment, or can be rendered by a graphics processing unit (GPU) (not separately shown), in another embodiment. In one embodiment, display 145 is a touch screen that is also capable of receiving touch/tactile input from a user of image capturing device 100, when the user is interfacing with a displayed GUI. In at least one embodiment, image capturing device 100 can include a plurality of virtual buttons or affordances that operate in addition to, or in lieu of, hardware buttons 106a-n. For example, image capturing device 100 can be equipped with a touch screen interface and provide, via a GUI, a virtual keyboard or other virtual icons for user interfacing therewith.

Image capturing device 100 also includes serial port 132 (e.g., a universal serial bus (USB) port), battery 134, and charging circuitry 136. Serial port 132 can operate as a charging port that receives power via an external charging device (not pictured) for charging battery 134 via charging circuitry 136. Battery 134 may include a single battery or multiple batteries for providing power to components of image capturing device 100. Serial port 132 may also function as one of an input port, an output port, and a combination input/output port. In one embodiment, battery 134 may include at least one battery that is removable and/or replaceable by an end user. In another embodiment, battery 134 may include at least one battery that is permanently secured within/to image capturing device 100.

Image capturing device 100 may also include one or more wireless radios 140a-n and can include one or more antenna(s) 148a-n that enable image capturing device 100 to wirelessly connect to, and transmit and receive voice and/or data communication to/from, one or more other devices, such as devices 152a-n and server 154. As a wireless device, image capturing device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, image capturing device 100 may be further equipped with infrared (IR) device (not pictured) for communicating with other devices using an IR connection. In another embodiment, wireless radios 140*a-n* may include a short-range wireless device, including, but not limited to, a near field communication (NFC) device. In still another embodiment, image capturing device 100 may communicate with one or more other device(s) using a wired or wireless USB connection.

Figure 2:
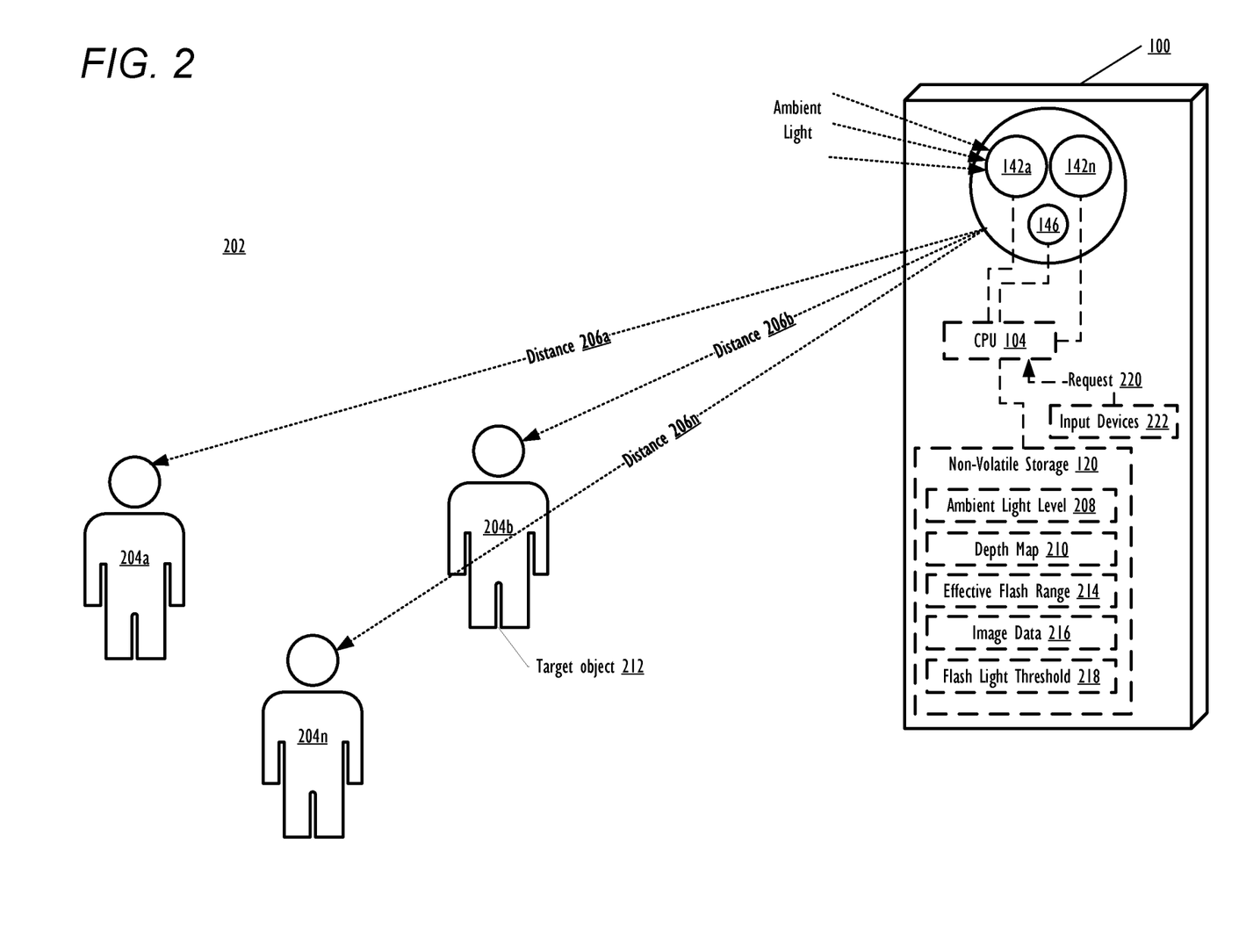
FIG. 2 illustrates an example image capturing device configured to control flash behavior of a camera during capture of image data, in accordance with one or more embodiments.

FIG. 2 is a block diagram illustrating additional functional components within example image capturing device 100, which is configured to control flash behavior of a camera during capture of image data, in accordance with one or more embodiments of the present disclosure. As illustrated, image capturing device 100 includes CPU 104, which executes FMU 117. Image capturing device 100 also includes memory 110, cameras 142*a-n*, flash 146, and input device 222. Scene 202 includes objects 204*a-n*.

In one or more embodiments, cameras 142*a-n* are utilized collectively by CPU 104 to perform a stereo analysis of objects 204*a-n* in current scene 202. It should be noted that objects 204*a-n* may include inanimate objects or living beings, such as persons or animals. In one or more embodiments, in response to performing the stereo analysis of objects 204*a-n* in current scene 202, CPU 104 generates a real-time depth map 210 based on a known physical distance between camera 142*a* and camera 142*n* and a difference in perspective of each object in current scene 202 as viewed by camera 142*a* and camera 142*n* during the stereo analysis. Depth map 210 identifies an estimated distance (distance 206*a-n*) from image capturing device 100 to each object (objects 204*a-n*). Scene 202 is continually monitored/analyzed by cameras 142*a-n* to update depth map 210. In another embodiment, image capturing device 100 utilizes sensors, such as time-of-flight emitters/receivers and structured light emitters/receivers (not pictured), to generate depth map 210.

In response to generating depth map 210, CPU 104 monitors input devices 222 of image capturing device 100 for request 220 to capture image data 216. In one embodiment, request 220 is received via a selection of a physical or virtual camera shutter button. In response to receiving request 220, CPU 104 identifies target object 212 within scene 202. Target object 212 is an object from among objects 204*a-n* that is selected as a focus point of cameras 142*a-n* within current scene 202.

In one embodiment, target object 212 is selected via an input device 222. For example, a viewfinder (not pictured) of image capturing device 100 can be divided into multiple regions and a user of image capturing device 100 may select object 204*b* as target object 212 by touching the region within the viewfinder where object 204*b* is located. In one or more embodiments, target object 212 is selected by a user prior to receiving request 220. For example, a user may select target object 212 by selecting a particular region and/or by zooming in on a particular object before pressing manual or virtual shutter button of image capturing device 100.

In another embodiment, CPU 104 uses cameras 142*a-n* to scan current scene 202. CPU 104 then performs a facial analysis on the scan data to identify at least one human face in current scene 202. In one embodiment, in response to identifying only one face in current scene 202, CPU 104 selects that face as target object 212. In another embodiment, in response to identifying more than one face in current scene 202, CPU 104 identifies a largest face in current scene 202 and selects the largest face as target object 212. In still another embodiment, in response to identifying more than one face in current scene 202, CPU 104 identifies, from depth map 210, a closest human face from among the at least one human face and selects the closest human face as target object 212. In other embodiments, faces of non-human creatures, such as dogs or cats, may also be selected by CPU 104 as target object 212. In still another embodiment, when detecting both human faces and non-human faces, CPU 104 may prioritize human faces over non-human faces when selecting target object 212. For example, CPU 104 selects, as target object 212, a human face that is off-centered in the field of view of cameras 142*a-n* over a non-human face that is centered in the field of view.

In another embodiment, CPU 104 identifies at least one object 204 in a center region within a field of view of cameras 142*a-n*. CPU 104 then selects a centermost object (e.g., object 204*b*) from among the at least one object in the center region as target object 212.

It should also be noted that FMU 117 may establish a priority order for the above embodiments for detecting target object 212. For example, a highest priority may be assigned to a user selected target object 212, a medium priority may be assigned to a selected face by CPU 104, and a lowest priority may be assigned to a centermost object in a field of view of cameras 142*a-n*. Thus, with this embodiment, a user selected target object always takes precedence over a detected face and a centermost object, and a detected face takes priority over a centermost object in a field of view of cameras 142*a-n*.

In response to identifying object 204*b* as target object 212, CPU 104 determines, based on depth map 210, distance 206*b* to target object 212. In response to determining distance 206*b*, CPU 104 determines whether distance 206*b* is greater than effective flash range 214 of flash 146. Effective flash range 214 is a predefined range (e.g., 1-4 meters) in which flash 146 can provide enough light to illuminate objects 204 in current scene 202 for capture by cameras 142*a-n*.

In response to determining distance 206*b* is less than or equal to effective flash range 214, CPU 104 determines ambient light level 208 within current scene 202. In one embodiment, CPU 104 triggers cameras 142*a-n* to scan current scene 202 and return grid statistics that include a measurement of a light intensity of current scene 202 at each pixel of cameras 142*a-n*. CPU 104 analyzes the grid statistics to determine ambient light level 208 of current scene 202. The light intensity data may be identified during the scan/analysis to identify objects 204*a-n* in current scene 202 or may be measured during a separate scan of current scene 202. In another embodiment, CPU 104 triggers an ambient light sensor (e.g. sensor 122) to measure ambient light level 208 within current scene 202. In response to measuring ambient light level 208, CPU 104 determines whether ambient light level 208 is less than flash light threshold 218 that is associated with flash 146. Flash light threshold 218 is a predetermined value that establishes a maximum ambient light level threshold (e.g., 30 lux) in which flash 146 is usable to improve an amount of light projected onto an object 204 in current scene 202. It should be noted that in another embodiment, CPU 104 measures/determines ambient light level 208 via cameras 142*a-n* prior to determining the distance (e.g., distance 206*b*) to target object 212.

In response to determining that distance 206*b* is less than or equal to effective flash range 214 and ambient light level 208 is less than or equal to flash light threshold 218, CPU 104 triggers flash 146 to illuminate current scene 202 and contemporaneously triggers at least one of cameras 142*a-n* to capture image data 216. The illumination by flash 146 of current scene 202 thus occurs autonomously. In one embodiment, when the above conditions are met, CPU 104 may trigger flash 146 to illuminate current scene 202 during capture of image data 216 only when a flash setting associated with the flash module is set to a particular setting (e.g., "auto" flash setting). In this embodiment, CPU 104 will not override a pre-established behavior associated with other flash settings (e.g., "off" or "on" flash settings). In response to determining distance 206b is greater than effective flash range 214 and/or ambient light level 208 is greater than flash light threshold 218, CPU 104 triggers at least one of cameras 142a-n to capture image data 216 without the use of flash 146. Thus, in this embodiment, if distance 206b is greater than effective flash range 214 and/or ambient light level 208 is greater than flash light threshold 218, CPU 104 disables flash 146 during the capture of image data 216, if the flash setting of the image capturing device 100 is set to the "auto" setting. In another embodiment, when the above conditions are met, CPU 104 may trigger flash 146 to illuminate current scene 202 during capture of image data 216 regardless of the current default/manual flash setting of the image capturing device (e.g., the flash being set to an "on", "auto", or "off" setting). In this embodiment, if distance 206b is greater than effective flash range 214 and/or ambient light level 208 is greater than flash light threshold 218, CPU 104 disables flash 146 during the capture of image data 216, regardless of the (manual/default) flash setting of the image capturing device 100.

Captured image data 216 is stored to non-volatile storage 120. In one embodiment, image data 216 includes a two-dimensional image captured by a single one of cameras 142a-n. In another embodiment, image data 216 includes an image captured by each of cameras 142a-n which may be combined by CPU 104 to create a three-dimensional "stereo" image (not illustrated).

Figure 3:
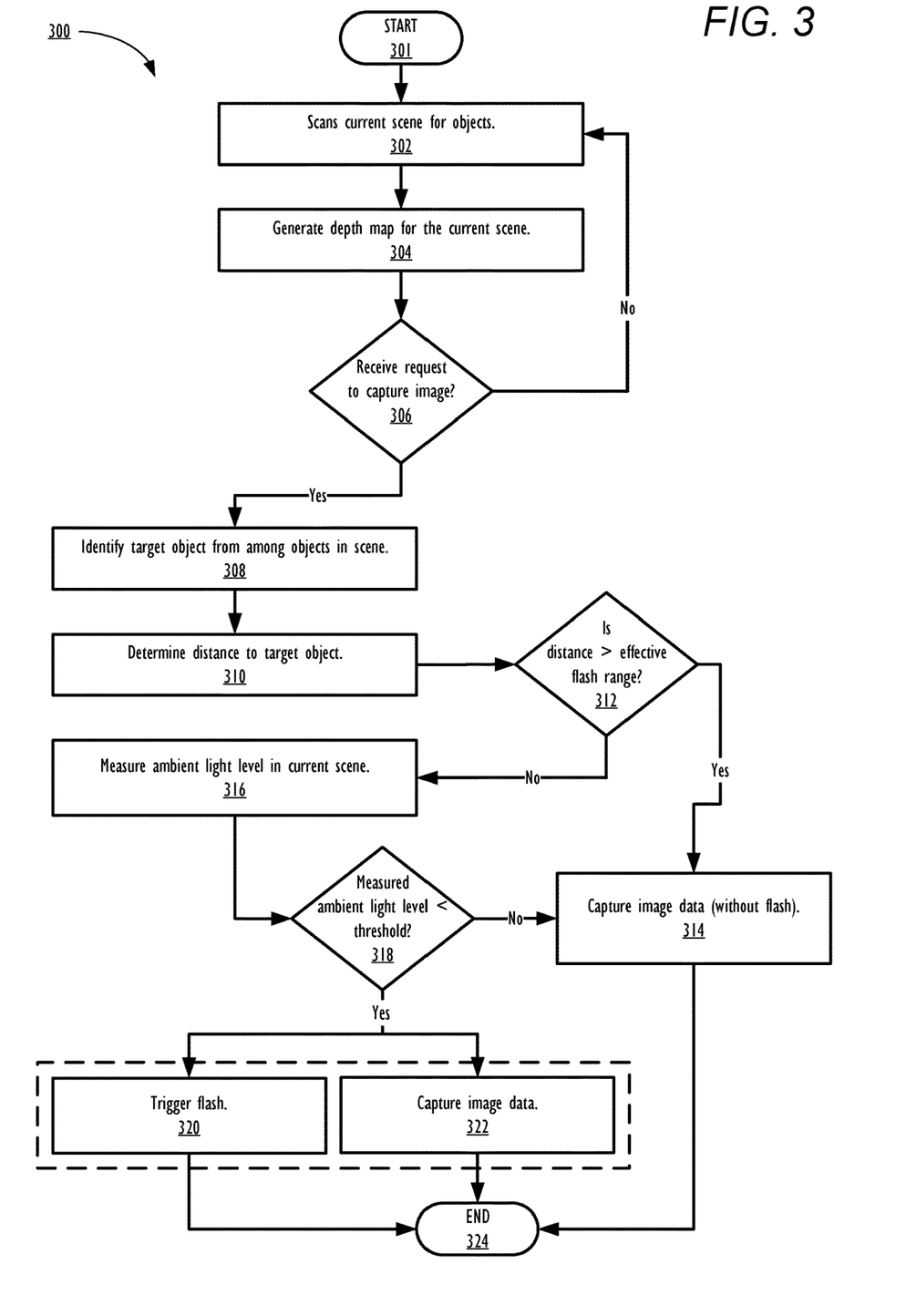
FIG. 3 is a flow chart illustrating a method for controlling flash behavior of a camera during capture of image data, in accordance with one or more embodiments.

Referring now to FIG. 3, there is depicted a high-level flow-chart illustrating a method for controlling flash behavior of a camera during capture of image data, in accordance with one or more embodiments of the present disclosure. Aspects of the method are described with reference to the components of FIGS. 1-2. Several of the processes of the method provided in FIG. 3 can be implemented by a processor (e.g., CPU 104) executing software code of FMU 117 within an image capturing device (e.g., image capturing device 100). The method processes described in FIG. 3 are generally described as being performed by components of image capturing device 100.

Method 300 commences at initiator block 301 then proceeds to block 302. At block 302, CPU 104 scans, via cameras 142a-n, current scene 202 for objects 204a-n. At block 304, CPU 104 generates, based on the scans by camera 142a-n, depth map 210, which specifies a distance from image capturing device 100 to each object in current scene 202. At block 306, CPU 104 determines whether a request to capture image data has been received (e.g., by detecting a pressing/selection of a manual or virtual shutter button on image capturing device 100). In response to determining that a request has not been received to capture image data, method 300 loops back to block 302 where current scene 202 is rescanned for objects. The depth map is updated based on the new scan data (block 304).

In response to determining a request to capture image data has been received, CPU 104 identifies target object 212 from among objects 204a-n in current scene (block 308). One example method for determining target object 212 is described in greater detail in FIG. 4, below. In response to identifying target object 212, CPU 104 determines a distance (e.g., distance 206b) to target object 212 (block 310). At block 312, CPU 104 determines whether the distance to target object 212 is greater than the effective flash range 214 of flash 146. In response to determining that the distance to target object 212 is greater than the effective flash range 214 of flash 146, image data 216 is captured via at least one of cameras 142a-n without the use of flash 146 (block 314). Method 300 then terminates at block 324.

In response to determining the distance to target object 212 is not greater than the effective flash range 214 of flash 146, CPU 104 measures ambient light level 208 via cameras 142a-n (block 316). At block 318, CPU 104 determines whether ambient light level 208 is less than flash light threshold 218. In response to determining that ambient light level 208 is not less than flash light threshold 218, image data 216 is captured via at least one of cameras 142a-n without the use of flash 146 (block 314). Method 300 then terminates at block 324.

In response to determining, at block 318, that ambient light level 208 is less than flash light threshold 218 and that the distance to target object 212 is not greater than the effective flash range 214 of flash 146, CPU 104 triggers flash 146 to illuminate current scene 202 (block 320) and contemporaneously triggers at least one of cameras 142a-n to capture image data 216 (block 322). Method 300 then terminates at block 324. It should be noted while the illustrated embodiment provides determining whether the distance to target object 212 is greater than the effective flash range 214 prior to determining whether ambient light level 208 is less than flash light threshold 218, in other embodiments, CPU 104 measures ambient light level 208 prior to determining whether the distance to target object 212 is greater than the effective flash range 214. In another embodiment, CPU 104 may perform these determinations simultaneously.

Figure 4:
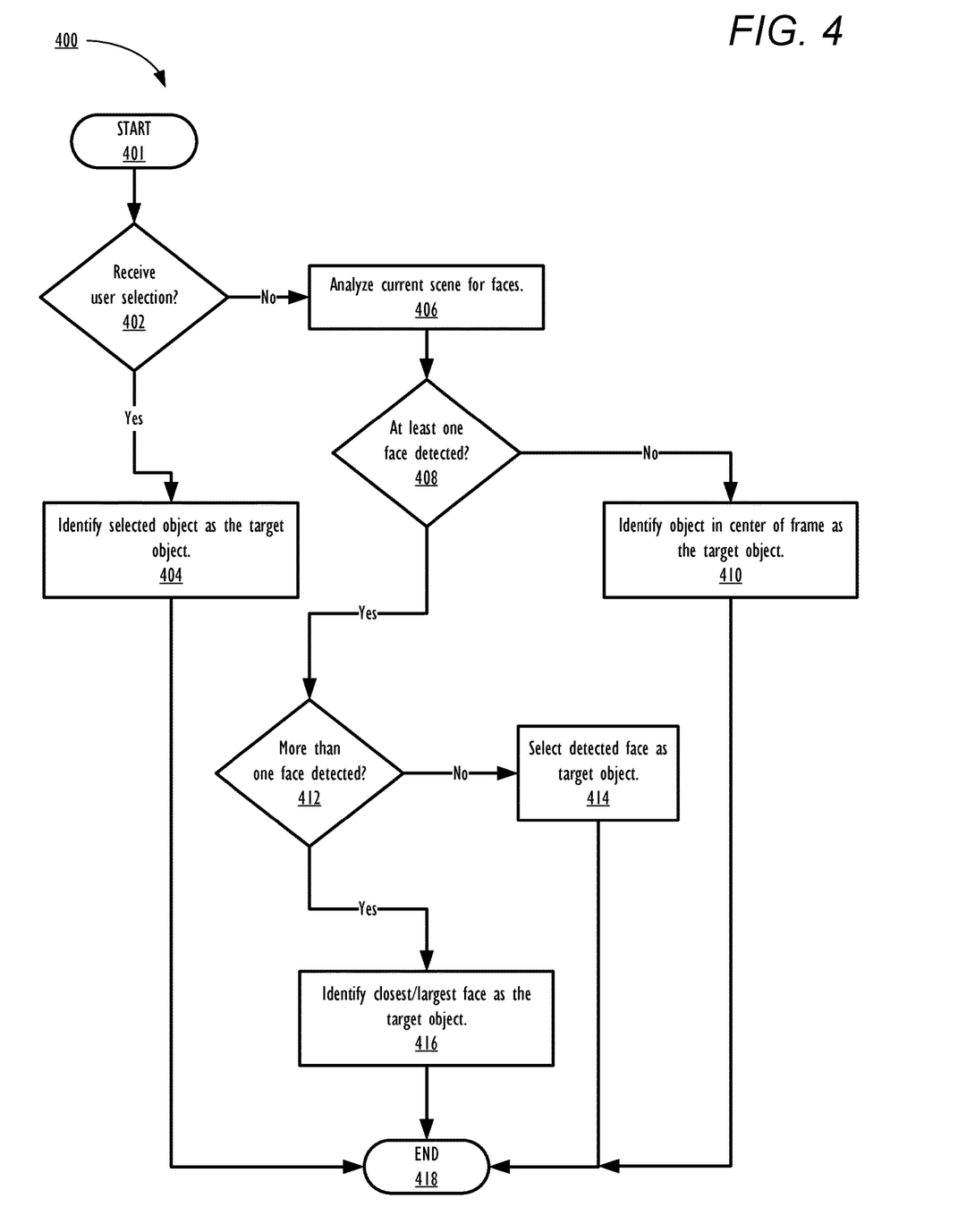
FIG. 4 is a flow chart illustrating a method for identifying a target subject within a current scene, in accordance with one or more embodiments.

Referring now to FIG. 4, there is depicted a high-level flow-chart illustrating a method for determining a subject in a current scene, in accordance with one or more embodiments of the present disclosure. Aspects of the method are described with reference to the components of FIGS. 1-2. Several of the processes of the method provided in FIG. 4 can be implemented by a processor (e.g., CPU 104) executing software code of FMU 117 within an image capturing device (e.g., image capturing device 100). The method processes described in FIG. 4 are generally described as being performed by components of image capturing device 100. In one or more embodiments, the processes described in FIG. 4 may be performed within step 308 of FIG. 3.

Method 400 commences at initiator block 401 then proceeds to block 402. At block 402, CPU 104 determines whether a user selection of a target object (e.g., target object 212) from among a plurality of objects (e.g., objects 204a-n) has been received via an input device (e.g., touch screen). In response to determining a user selection of a target object has been received, CPU 104 identifies the selected object as target object 212 (block 404). Method 400 then terminates at block 418.

In response to determining a user selection of a target object has not been received, CPU 104 analyzes current scene 202 via cameras 142a-n to identify at least one face (block 406). At block 408, CPU 104 determines whether at least one face has been detected in current scene. In response to the analysis identifying no faces in current scene 202, CPU 104 identifies a centermost object from among the at least one object in the center region of current scene 202 as target object 212 (block 410). Method 400 then terminates at block 418.

In response to the analysis identifying at least one face in current scene 202, CPU 104 determines whether more than one face has been detected in current scene 202 (block 412). In response to identifying only one face in current scene 202, CPU 104 selects the identified face as target object 212 (block 414) and method 400 terminates at block 418. In response to determining that more than one face has been detected in current scene 202, CPU 104 selects a closest face from among the identified faces in current scene 202 as target object 212 (block 416). In another embodiment, in block 416 CPU 104 selects a largest face from among the identified faces in current scene 202 as target object 212. The faces may include human and non-human faces (e.g., dog faces and cat faces). In still another embodiment, CPU 104 selects, as target object 212, a human face from among the identified faces in current scene 202 over any non-human faces and/or inanimate objects. Method 400 then terminates at block 418.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
   identifying a target object from among a plurality of objects in a current scene, the identifying comprising:
   analyzing the plurality of objects in the current scene for at least one human face;
   in response to the analysis identifying at least one human face, selecting at least one of a closest human face and a largest human face from among the at least one human face as the target object; and
   in response to being unable to identify at least one human face, selecting as the target object at least one of (i) a non-human face and (ii) a centermost object from among at least one object in a center region within a field of view;

determining whether a distance to the target object is within an effective flash range of at least one flash module of an image capturing device, the effective flash range being a predefined range, in distance, in which the at least one flash module can provide enough light to illuminate the target object in the current scene for capture by at least one camera and outside of which the at least one flash module is not used during the capture of the image data for the target object by the at least one camera;

measuring, via at least one camera, an ambient light level within the current scene;

comparing the measured ambient light level to a predetermined threshold; and in response to determining the distance to the target object is within the effective flash range and the measured ambient level is less than the predetermined threshold, triggering at least one flash module of the image capturing device to illuminate the current scene during capture of image data by the at least one camera.

2. The method of claim 1, further comprising:
in response to determining the distance to the target object is greater than the effective flash range, preventing the at least one flash module from illuminating the scene during the capture of the image data.

3. The method of claim 1, wherein the at least one camera further comprises a first camera and a second camera, the method further comprising:
continuously monitoring, by the first camera and the second camera, a location of each of the plurality of objects in the current scene;
generating a real-time depth map that identifies a depth of the plurality of objects in the current scene; and
in response to identifying the target object in the current scene, estimating a distance to the target object based on the depth map.

4. The method of claim 1, wherein identifying the target object further comprises:
in response to identifying at least one human face:
identifying, from the depth map, the closest human face from among the at least one human face; and
selecting the closest human face as the target object.

5. The method of claim 1, wherein identifying the target object further comprises:
in response to identifying at least one human face, selecting the largest human face from among the at least one human face as the target object.

6. The method of claim 1, wherein identifying the target object further comprises:
receiving, at an input device, a selection of a region within a viewfinder that identifies the target object located within the region from among the plurality of objects in the current scene.

7. The method of claim 1, wherein identifying the target object further comprises:
in response to being unable to identify at least one human face, analyzing the plurality of objects in the current scene for at least one non-human face;
in response to the analysis identifying at least one non-human face, selecting at least one of a closest non-human face and a largest non-human face from among the at least one non-human face as the target object; and in response to being unable to identify at least one non-human face:
identifying at least one object in the center region within the field of view of the at least one camera; and
selecting the centermost object from among the at least one object in the center region as the target object.

8. An image processing device comprising:
at least one camera that:
scans a current scene for at least one object; and
measures an ambient light level within a current scene;
at least one processor that:
identifies a target object from among a plurality of objects in the current scene, wherein the at least one processor:
analyzes the plurality of objects in the current scene for at least one human face:
in response to the analysis identifying at least one human face, selects at least one of a closest human face and a largest human face from among the at least one human face as the target object; and
in response to being unable to identify at least one human face, selects as the target object at least one of (i) a non-human face and (ii) a centermost object from among at least one object in a center region within a field of view;
determines whether a distance to the target object is within an effective flash range of the image capturing device, the effective flash range being a predefined range, in distance, in which the at least one flash module can provide enough light to illuminate the target object in the current scene for capture by the at least one camera and outside of which the at least one flash module is not used during the capture of the image data for the target object by the at least one camera;
compares the measured ambient light level to a predetermined threshold; and
in response to determining the measured ambient level is less than the predetermined threshold and the distance to the target object is within the effective flash range, triggers at least one camera flash module to illuminate the current scene during capture of image data by the at least one camera;
wherein the at least one camera captures the image data in the current scene.

9. The image capturing device of claim 8, wherein the processor:
in response to determining the distance to the target object is greater than the effective flash range, prevents the at least one flash module from illuminating the scene during the capture of the image data.

10. The image capturing device of claim 8, wherein:
the at least one camera further comprises:
a first camera that continuously monitors a location of each of the plurality of objects in the current scene; and
a second camera that contemporaneously monitors the location of each of the plurality of objects in the current scene;
the at least one processor:
generates, based on the location of each of the plurality of objects in the current scene as identified by the first camera and the second camera, a real-time depth map that identifies a depth of the plurality of objects in the current scene; and in response to identifying the target object in the current scene, estimates a distance to the target object based on the depth map.

11. The image capturing device of claim 8, wherein in identifying the target object, the at least one processor:
in response to identifying at least one human face, identifies, from the depth map, the closest human face from among the at least one human face; and
selects the closest human face as the target object.

12. The image capturing device of claim 8, wherein in identifying the target object, the at least one processor:
in response to identifying at least one human face, selects the largest human face from among the at least one human face as the target object.

13. The image capturing device of claim 8, further comprising:
at least one input device that receives a selection of a region within a viewfinder of an object located within the region from among the plurality of objects in the current scene;
wherein in receiving the selection, the at least one processor identifies the selected object located within the region as the target object.

14. The image capturing device of claim 8, wherein in identifying the target object the at least one processor:
in response to being unable to identify at least one human face, analyzes the plurality of objects in the current scene for at least one non-human face;
in response to the analysis identifying at least one non-human face, selects at least one of a closest non-human face and a largest non-human face from among the at least one non-human face as the target object; and
in response to being unable to identify at least one non-human face:
identifies at least one object in the center region within the field of view of the at least one camera; and
selects the centermost object from among the at least one object in the center region as the target object.

15. A computer program product comprising:
a non-transitory computer readable storage device; and
program code on the computer readable storage device that, when executed by a processor associated with an image capturing device, enables the image capturing device to provide the functionality of:
identifying a target object from among a plurality of objects in the current scene the identifying comprising:
analyzing the plurality of objects in the current scene for at least one human face:
in response to the analysis identifying at least one human face, selecting at least one of a closest human face and a largest human face from among the at least one human face as the target object; and
in response to being unable to identify at least one human face, selecting as the target object at least one of (i) a non-human face and (ii) a centermost object from among at least one object in a center region within a field of view;
determining whether a distance to the target object is within an effective flash range of at least one flash module of an image capturing device, the effective flash range being a predefined range, in distance, in which the at least one flash module can provide enough light to illuminate the target object in the current scene for capture by at least one camera and outside of which the at least one flash module is not used during the capture of the image data for the target object by the at least one camera;
measuring, via at least one camera of the image capturing device, an ambient light level within a current scene;
comparing the measured ambient light level to a predetermined threshold; and
in response to determining the distance to the target object is within the effective flash range and the measured ambient level is less than the predetermined threshold, triggering at least one flash module of the image capturing device to illuminate the current scene during capture of image data by the at least one camera.

16. The computer program product of claim 15, wherein the at least one camera further comprises a first camera and a second camera, the program code further comprising code for:
continuously monitoring, by the first camera and the second camera, a location of each of the plurality of objects in the current scene;
generating a real-time depth map that identifies a depth of the plurality of objects in the current scene; and
in response to identifying the target object in the current scene, estimating a distance to the target object based on the depth map.

17. The computer program product of claim 16, the program code for identifying the target object further comprising code for:
in response to identifying at least one human face:
identifying, from the depth map, the closest human face from among the at least one human face; and
selecting the closest human face as the target object.

18. The computer program product of claim 15, the program code for identifying the target object further comprising code for:
in response to being unable to identify at least one human face, analyzing the plurality of objects in the current scene for at least one non-human face;
in response to the analysis identifying at least one non-human face, selecting at least one of a closest non-human face and a largest non-human face from among the at least one non-human face as the target object; and
in response to being unable to identify at least one non-human face:
identifying at least one object in the center region within the field of view of the at least one camera; and
selecting the centermost object from among the at least one object in the center region as the target object.

19. The computer program product of claim 15, the program code further enabling the image capturing device to provide the functionality of:
in response to determining the distance to the target object is greater than the effective flash range, preventing the at least one flash module from illuminating the scene during the capture of the image data.

20. The computer program product of claim 15, wherein the program code for identifying the target object further comprises program code for:
in response to identifying at least one human face, selecting the largest human face from among the at least one human face as the target object.

* * * * *